US012620070B2

(12) United States Patent (10) Patent No.: US 12,620,070 B2
Inha et al. (45) Date of Patent: May 5, 2026

(54) DETERMINING AND USING POINT SPREAD FUNCTION FOR IMAGE DEBLURRING

(71) Applicant: Varjo Technologies Oy, Helsinki (FI)

(72) Inventors: Kai Inha, Järvenpää (FI); Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 428 days.

(21) Appl. No.: 17/991,368

(22) Filed: Nov. 21, 2022

(65) Prior Publication Data

US 2024/0169493 A1 May 23, 2024

(51) Int. Cl.
| | |
|---|---|
| G06T 5/73 | (2024.01) |
| G06T 5/20 | (2006.01) |
| G06T 5/50 | (2006.01) |
| G06T 7/55 | (2017.01) |
| G06T 7/70 | (2017.01) |

(52) U.S. Cl.
CPC .................. G06T 5/73 (2024.01); G06T 5/20 (2013.01); G06T 5/50 (2013.01); G06T 7/55 (2017.01); G06T 7/70 (2017.01); *G06T 2207/20084* (2013.01); *G06T 2207/30201* (2013.01); *G06T 2207/30244* (2013.01)

(58) Field of Classification Search
CPC .... G06T 5/73; G06T 5/20; G06T 5/50; G06T 7/55; G06T 7/70; G06T 2207/20084; G06T 2207/30201; G06T 2207/30244; G06T 2207/20081; G06T 5/60
USPC ........................................ 382/255
See application file for complete search history.

(56) References Cited

U.S. PATENT DOCUMENTS

| | | | | |
|---|---|---|---|---|
| 7,436,595 B2 * | 10/2008 | Cathey, Jr. | ............. | G02B 27/52 |
| | | | | 382/254 |
| 9,565,416 B1 * | 2/2017 | Lewkow | ............. | H04N 13/207 |
| 10,542,208 B2 * | 1/2020 | Lelescu | ..................... | G06T 7/20 |
| 10,554,918 B1 * | 2/2020 | Derakhshani | .......... | G06V 40/19 |
| 11,127,119 B1 * | 9/2021 | Slutsky | ..................... | G06T 5/60 |

(Continued)

OTHER PUBLICATIONS

Jiang et al, "Space-variant point spread function measurement and interpolation at any depth based on single-pixel imaging", Optics Express, vol. 28, No. 7, https://doi.org/10.1364/OE.386366, Mar. 30, 2020, 15 pages.

(Continued)

*Primary Examiner* — Henok Shiferaw
*Assistant Examiner* — Dion J Satcher
(74) *Attorney, Agent, or Firm* — Ziegler IP Law Group, LLC.

(57) ABSTRACT

A method including: obtaining images captured using camera(s), depth maps corresponding to images, and pose information; identifying image segment(s) for first image and second image; determining first relative pose of same object captured in first image; determining second relative pose of same object captured in second image; when same object is in-focus in first image, reprojecting at least image segment(s) of first image; and determining for given camera that captured second image a point spread function as function of optical depth; obtaining third image captured using given camera and third depth map corresponding to third image; and applying extended depth-of-field correction to image segment(s) of third image that is out of focus, by using point spread function.

23 Claims, 3 Drawing Sheets

(56) References Cited

U.S. PATENT DOCUMENTS

| | | | |
|---|---|---|---|
| 11,408,814 B2* | 8/2022 | Weiss | G01N 15/1433 |
| 2012/0176528 A1* | 7/2012 | Denny | H04N 17/002 |
| | | | 348/E5.045 |
| 2014/0023283 A1* | 1/2014 | Liu | G02B 21/367 |
| | | | 382/232 |
| 2016/0140748 A1* | 5/2016 | Cline | G06V 10/56 |
| | | | 345/475 |
| 2016/0343131 A1* | 11/2016 | Holt | G06T 5/73 |
| 2017/0076430 A1* | 3/2017 | Xu | G06F 3/04883 |
| 2017/0265726 A1* | 9/2017 | Mikami | H04N 23/675 |
| 2018/0176483 A1* | 6/2018 | Knorr | H04N 23/957 |
| 2019/0004282 A1* | 1/2019 | Park | G02B 7/09 |
| 2019/0158803 A1* | 5/2019 | Mizukura | H04N 23/959 |
| 2019/0328209 A1* | 10/2019 | Springer | G02B 27/0075 |
| 2023/0071384 A1* | 3/2023 | Agarwal | B25J 19/023 |

OTHER PUBLICATIONS

Tan et al, "EDOF-ToF: extended depth of field time-of-flight imaging", Optics Express, vol. 29, No. 23, https://doi.org/10.1364/OE.441515, Nov. 8, 2021, 17 pages.

* cited by examiner

DETERMINING AND USING POINT SPREAD FUNCTION FOR IMAGE DEBLURRING

TECHNICAL FIELD

The present disclosure relates to computer-implemented methods for determining and using point spread functions (PSFs) for image deblurring. The present disclosure also relates to systems for determining and using PSFs for image deblurring. The present disclosure also relates to computer program products for determining and using PSFs for image deblurring.

BACKGROUND

In the recent decade, three-dimensional (3D) telepresence is actively being explored by researchers to bring the world closer. Such a 3D telepresence involves using evolving technologies such as immersive extended-reality (XR) technologies which makes an individual feel as if they are present at a location different from an existing location of the individual. With recent advancements in such technologies, demand for high-quality image generation has been increasing. Several advancements are being made to develop image generation techniques that facilitate generation of high-quality images using image reconstruction (namely, image resynthesis).

Despite progress in cameras used for image capturing, existing techniques and equipment for image generation has several limitations associated therewith. Firstly, cameras used for image capturing typically suffer from depth-of-field issues. Such depth-of-field issues can be resolved to some extent by adjusting a size of an aperture of a given camera. However, when the size of the aperture of the given camera is significantly smaller, images of a real-world environment in a low-light setting are not captured properly by the given camera. Moreover, larger the size of the aperture, narrower is the depth-of-field. Hence, images of the real-world environment are sharply captured only within a focusing distance range of the given camera, and are captured blurred outside the focusing distance range. Furthermore, even when an auto-focus camera is employed for capturing the images, it is still not possible to capture sharp (i.e., in-focus) images in an entire field of view, because the auto-focus camera can be adjusted according to only one focusing distance range at a time. Therefore, the generated images are of low quality and unrealistic, and are often generated with considerable latency/delay.

Secondly, upon capturing images that are blurred (i.e., images having defocus blur), some existing techniques employ machine learning-based tuning algorithms to reverse (namely, remove) blur from the images. However, such tuning algorithms can only be implemented for cameras using a specific lens setup. Thus, image correction lacks a required resolution which is necessary for high-fidelity image generation, as said algorithms have limited capability, for example, in terms of reproducing realistic and accurate visual details of the real-world environment. Moreover, some existing techniques employ several optical elements and cameras for image generation. However, such an implementation increases an overall cost, power consumption, fault susceptibilities, and the like.

Therefore, in light of the foregoing discussion, there exists a need to overcome the aforementioned drawbacks associated with existing equipment and techniques for image generation.

SUMMARY

The present disclosure seeks to provide a computer-implemented method for determining and using point spread function for image deblurring. The present disclosure also seeks to provide a system for determining and using point spread function for image deblurring. The present disclosure also seeks to provide a computer program product for determining and using point spread function for image deblurring. An aim of the present disclosure is to provide a solution that overcomes at least partially the problems encountered in prior art.

In a first aspect, the present disclosure provides a computer-implemented method comprising:

obtaining a plurality of images of a real-world environment captured using at least one camera, a plurality of depth maps captured corresponding to the plurality of images, and pose information indicative of corresponding camera poses from which the plurality of images and the plurality of depth maps are captured;

for a given pair of a first image and a second image from amongst the plurality of images, identifying at least one image segment of the first image and at least one image segment of the second image that represent a same object that is present in the real-world environment, wherein the same object is in-focus in one of the first image and the second image, but is out-of-focus in another of the first image and the second image;

determining a first relative pose of the same object with respect to a first camera pose from which the first image is captured, based on optical depths in a segment of a first depth map corresponding to the at least one image segment of the first image, and a location of the at least one image segment in a field of view of the first image;

determining a second relative pose of the same object with respect to a second camera pose from which the second image is captured, based on optical depths in a segment of a second depth map corresponding to the at least one image segment of the second image, and a location of the at least one image segment in a field of view of the second image;

when the same object is in-focus in the first image, reprojecting at least the at least one image segment of the first image from the first relative pose to the second relative pose; and determining for a given camera that captured the second image a point spread function as a function of optical depth, based on a correlation between reprojected pixels of the at least one image segment of the first image and respective pixels of the at least one image segment of the second image, and respective optical depths in the segment of the second depth map corresponding to the at least one image segment of the second image;

obtaining a third image of the real-world environment captured using a given camera and a third depth map captured corresponding to the third image; and applying an extended depth-of-field correction to at least one image segment of the third image that is out of focus, by using a point spread function determined for the given camera, based on optical depths in a segment of the third depth map corresponding to the at least one image segment of the third image.

In a second aspect, the present disclosure provides a system comprising at least one server that is configured to:

obtain a plurality of images of a real-world environment captured using at least one camera, a plurality of depth maps captured corresponding to the plurality of images, and pose information indicative of corresponding camera poses from which the plurality of images and the plurality of depth maps are captured;

for a given pair of a first image and a second image from amongst the plurality of images, identify at least one image segment of the first image and at least one image segment of the second image that represent a same object that is present in the real-world environment, wherein the same object is in-focus in one of the first image and the second image, but is out-of-focus in another of the first image and the second image;

determine a first relative pose of the same object with respect to a first camera pose from which the first image is captured, based on optical depths in a segment of a first depth map corresponding to the at least one image segment of the first image, and a location of the at least one image segment in a field of view of the first image;

determine a second relative pose of the same object with respect to a second camera pose from which the second image is captured, based on optical depths in a segment of a second depth map corresponding to the at least one image segment of the second image, and a location of the at least one image segment in a field of view of the second image;

when the same object is in-focus in the first image,
    reproject at least the at least one image segment of the first image from the first relative pose to the second relative pose; and
    determine for a given camera that captured the second image a point spread function as a function of optical depth, based on a correlation between reprojected pixels of the at least one image segment of the first image and respective pixels of the at least one image segment of the second image, and respective optical depths in the segment of the second depth map corresponding to the at least one image segment of the second image;

obtain a third image of the real-world environment captured using a given camera and a third depth map captured corresponding to the third image; and apply an extended depth-of-field correction to at least one image segment of the third image that is out of focus, by using a point spread function determined for the given camera, based on optical depths in a segment of the third depth map corresponding to the at least one image segment of the third image.

In a third aspect, the present disclosure provides a computer program product comprising a non-transitory machine-readable data storage medium having stored thereon program instructions that, when executed by a processor, cause the processor to execute steps of a computer-implemented method of the first aspect.

Embodiments of the present disclosure substantially eliminate or at least partially address the aforementioned problems in the prior art, and enable facilitate a simple, fast, accurate, and improved image deblurring by way of determining and using point spread function, thereby generating images having high realism and high visual fidelity, in real time or near-real time.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1A:
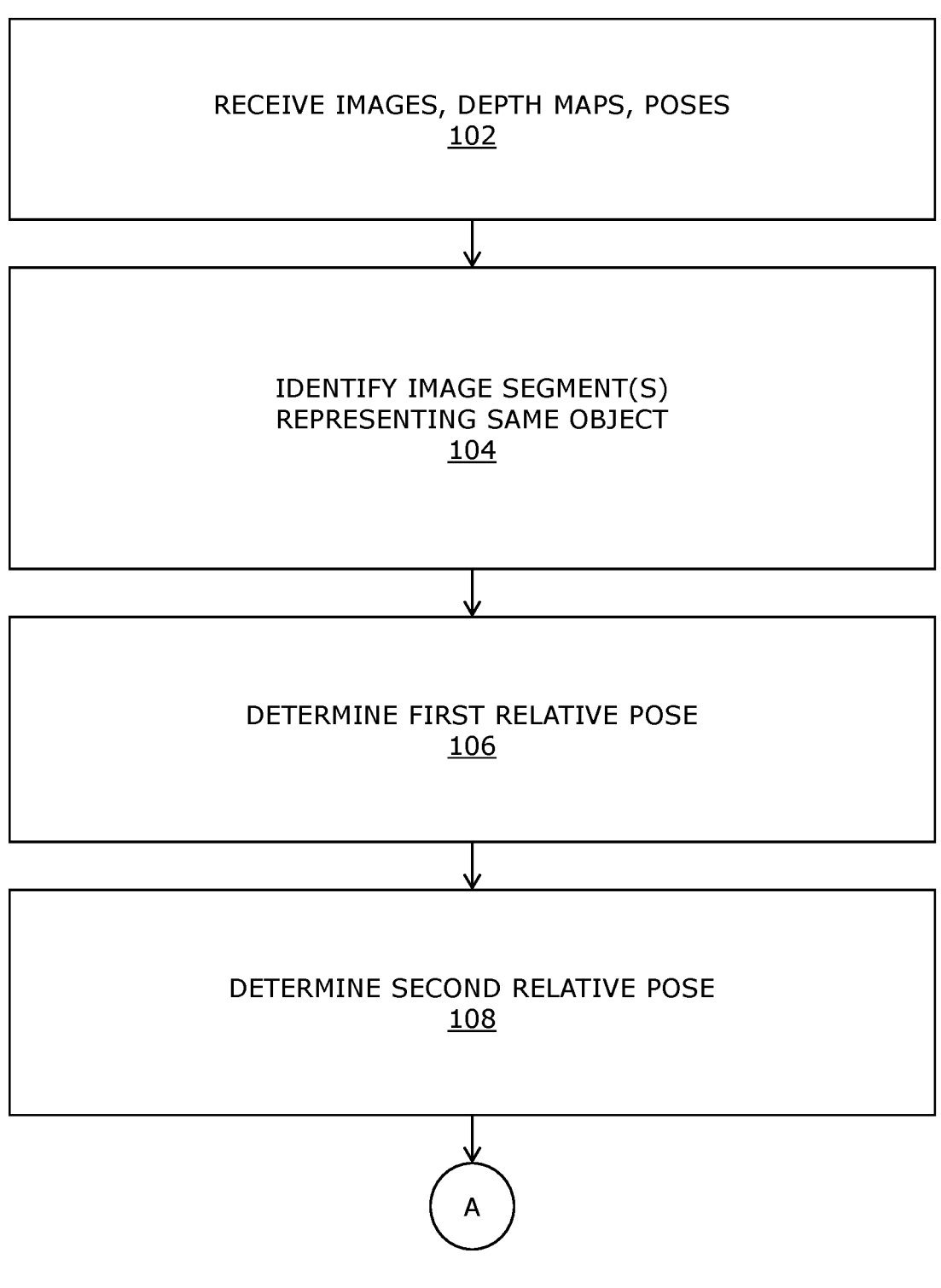
FIGS. 1A and 1B illustrate steps of a computer-implemented method for determining and using point spread function for image deblurring, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a computer-implemented method comprising:

obtaining a plurality of images of a real-world environment captured using at least one camera, a plurality of depth maps captured corresponding to the plurality of images, and pose information indicative of corresponding camera poses from which the plurality of images and the plurality of depth maps are captured;

for a given pair of a first image and a second image from amongst the plurality of images, identifying at least one image segment of the first image and at least one image segment of the second image that represent a same object that is present in the real-world environment, wherein the same object is in-focus in one of the first image and the second image, but is out-of-focus in another of the first image and the second image;

determining a first relative pose of the same object with respect to a first camera pose from which the first image is captured, based on optical depths in a segment of a first depth map corresponding to the at least one image segment of the first image, and a location of the at least one image segment in a field of view of the first image;

determining a second relative pose of the same object with respect to a second camera pose from which the second image is captured, based on optical depths in a segment of a second depth map corresponding to the at location of the at least one image segment in a field of
view of the second image;
when the same object is in-focus in the first image,
reprojecting at least the at least one image segment of
the first image from the first relative pose to the
second relative pose; and
determining for a given camera that captured the sec-
ond image a point spread function as a function of
optical depth, based on a correlation between repro-
jected pixels of the at least one image segment of the
first image and respective pixels of the at least one
image segment of the second image, and respective
optical depths in the segment of the second depth
map corresponding to the at least one image segment
of the second image;
obtaining a third image of the real-world environment
captured using a given camera and a third depth map
captured corresponding to the third image; and
applying an extended depth-of-field correction to at least
one image segment of the third image that is out of
focus, by using a point spread function determined for
the given camera, based on optical depths in a segment
of the third depth map corresponding to the at least one
image segment of the third image.
In a second aspect, the present disclosure provides a
system comprising at least one server that is configured to:
obtain a plurality of images of a real-world environment
captured using at least one camera, a plurality of depth
maps captured corresponding to the plurality of images,
and pose information indicative of corresponding cam-
era poses from which the plurality of images and the
plurality of depth maps are captured;
for a given pair of a first image and a second image from
amongst the plurality of images, identify at least one
image segment of the first image and at least one image
segment of the second image that represent a same
object that is present in the real-world environment,
wherein the same object is in-focus in one of the first
image and the second image, but is out-of-focus in
another of the first image and the second image;
determine a first relative pose of the same object with
respect to a first camera pose from which the first image
is captured, based on optical depths in a segment of a
first depth map corresponding to the at least one image
segment of the first image, and a location of the at least
one image segment in a field of view of the first image;
determine a second relative pose of the same object with
respect to a second camera pose from which the second
image is captured, based on optical depths in a segment
of a second depth map corresponding to the at least one
image segment of the second image, and a location of
the at least one image segment in a field of view of the
second image;
when the same object is in-focus in the first image,
reproject at least the at least one image segment of the
first image from the first relative pose to the second
relative pose; and
determine for a given camera that captured the second
image a point spread function as a function of optical
depth, based on a correlation between reprojected
pixels of the at least one image segment of the first
image and respective pixels of the at least one image
segment of the second image, and respective optical
depths in the segment of the second depth map
corresponding to the at least one image segment of
the second image;

obtain a third image of the real-world environment cap-
tured using a given camera and a third depth map
captured corresponding to the third image; and
apply an extended depth-of-field correction to at least one
image segment of the third image that is out of focus,
by using a point spread function determined for the
given camera, based on optical depths in a segment of
the third depth map corresponding to the at least one
image segment of the third image.
In a third aspect, the present disclosure provides a com-
puter program product comprising a non-transitory
machine-readable data storage medium having stored
thereon program instructions that, when executed by a
processor, cause the processor to execute steps of a com-
puter-implemented method of the first aspect.
The present disclosure provides the aforementioned
method, the aforementioned system, and the aforementioned
computer program product for facilitating a simple, fast,
accurate, and improved image deblurring by way of deter-
mining and using point spread function, thereby generating
images having high realism and high visual fidelity.
Herein, the point spread function (which is determined for
the given camera) is used for applying the extended depth-
of-field (EDOF) correction to the at least one image segment
of the third image that is out of focus. In this way, high-
quality and accurate images are generated in real time or
near-real time even when cameras have different focusing
distance ranges and depth-of-field issues. The method and
system do not require any special lens setup in a given
camera for image capturing, and are not based on conven-
tional machine learning-based tuning algorithms for image
correction. EDOF-corrected images are accurate and realis-
tic, for example, in terms of representing objects or their
parts. This potentially leads to a realistic, immersive viewing
experience for a user, when the images are displayed to the
user. The method and the system are simple, robust, fast,
reliable, support real-time high-quality image deblurring and
can be implemented with ease.
Notably, the at least one server controls an overall opera-
tion of the system. In some implementations, the at least one
server is implemented as a remote server. In such imple-
mentations, the remote server is separately located from the
at least one camera. Moreover, the remote server receives
the plurality of images from the at least one camera (or a
device comprising the at least one camera), or from a data
repository in which the plurality of images are prestored. As
an example, the remote server could be a cloud server that
provides a cloud computing service. Examples of the device
include, but are not limited to, a head-mounted display
(HMD) device and a teleport device. In other implementa-
tions, the at least one server is implemented as a processor
of a computing device. Examples of the computing device
include, but are not limited to, a laptop, a desktop computer,
a tablet, a phablet, a personal digital assistant, a workstation,
a console.
The term "head-mounted display" device refers to a
specialized equipment that is configured to present an
extended-reality (XR) environment to a user when said
HMD device, in operation is worn by a user on his/her head.
The HMD device is implemented, for example, as an XR
headset, a pair of XR glasses, and the like, that is operable
to display a scene of the XR environment to the user. The
term "extended-reality" encompasses virtual reality (VR),
augmented reality (AR), mixed reality (MR), and the like.
The term "teleport device" refers to a specialized equipment
that is capable of facilitating virtual teleportation.

It will be appreciated that the term "at least one server" refers to a "a single server" in some implementations, and to a "a plurality of servers" in other implementations. When the system comprises the single server, all operations of the system are performed by the single server. When the system comprises the plurality of servers, different operations of the system can be performed by different (and specially configured) servers from amongst the plurality of servers. As an example, the first server from amongst the plurality of servers may be configured to identify the at least one image segment of the first image and the at least one image segment of the second image that represent the same object, and a second server from amongst the plurality of servers may be configured to apply the extended depth-of-field correction to the at least one image segment of the third image that is out of focus.

Throughout the present disclosure, the term "data repository" refers to hardware, software, firmware, or a combination of these for storing at least one of: the plurality of images, the plurality of depth maps corresponding to the plurality of images, the pose information, information pertaining to relative poses of the same object, the point spread function for the given camera. It will be appreciated that the data repository could be implemented as a cloud-based memory, a memory of the at least one server, a memory of the device, a memory of the computing device, a local memory of the at least one camera, a removable memory, or similar. The data repository is communicably coupled to the at least one server. Optionally, the system comprises the data repository.

Throughout the present disclosure, the term "camera" refers to an equipment that is operable to detect and process light signals received from the real-world environment, so as to capture the images of the real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the at least one camera is implemented as a depth camera. Examples of the depth camera include, but are limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, and a Sound Navigation and Ranging (SONAR) camera. The at least one camera is optionally implemented as a combination of the visible-light camera and the depth camera. The at least one camera may have a sensor chip having some phase detection autofocus (PDAF) pixels. Optionally, the at least one camera (or the device comprising the at least one camera) is communicably coupled to the at least one server.

It will be appreciated that a given image is a visual representation of the real-world environment. The term "visual representation" encompasses colour information represented in the given image, and additionally optionally other attributes associated with the given image (for example, such as depth information, luminance information, transparency information, and the like). Furthermore, the term "depth map" refers to a data structure comprising information pertaining to optical depths of objects or their parts present in a given scene of the real-world environment.

The depth map provides information pertaining to distances (namely, the optical depths) of surfaces of the objects or their parts, from a given viewpoint and a given viewing direction of the at least one camera. Optionally, the depth map is an image comprising a plurality of pixels, wherein a pixel value of each pixel indicates an optical depth of its corresponding real point/region within the given scene of the real-world environment. The term "object" refers to a physical object or a part of the physical object present in the real-world environment. The object could be a living object (for example, such as a human, a pet, a plant, and the like) or a non-living object (for example, such as a wall, a window, a toy, a poster, a lamp, and the like). In a first example, the physical object may be a table present in the real-world environment, the table comprising four legs. In such a case, the four legs of the table could be considered as different objects. Each leg of the table may be present at different optical depths in the real-world environment.

Optionally, the at least one server is configured to receive a given image and its corresponding depth map from any one of:

the at least one camera being implemented as a combination of at least one visible-light camera and at least one depth camera, the device comprising the at least one camera, wherein the at least one camera is implemented as a combination of the at least one visible-light camera and the at least one depth camera, the data repository in which the plurality of images, the plurality of depth maps and the pose information are prestored.

It will be appreciated that a given depth map could also be generated using at least one of: depth from stereo, depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the given depth map could also be generated even without using the depth camera. In this regard, the given depth map could be generated by using at least one of: a neural network model, a monocular depth estimation technique, a monochrome image. The monocular depth estimation may employ a single (monocular) RGB image for estimating depth values to generate the given depth map.

Furthermore, the term "pose" encompasses both a position and an orientation. Optionally, in this regard, pose-tracking means is employed to detect and/or follow a pose of the at least one camera from which a given image and a given depth map are captured. Optionally, the at least one server optionally receives the pose information from any one of:

a device comprising pose-tracking means and the at least one camera, external pose-tracking means, the data repository in which the pose information is prestored along with the plurality of images and the plurality of depth maps.

The pose tracking means may employ an outside-in tracking technique, an inside-out technique, or a combination of both the aforesaid techniques, for collecting pose-tracking data. Such techniques are well known in the art. The pose-tracking data may be in form of at least one of: images, Inertial Measurement Unit (IMU) values, Time-Inertial Measurement Unit (TIMU) values, motion sensor data values, magnetic field strength values. Optionally, a processor of the device is configured to: process the pose-tracking data to determine a given pose of the at least one camera from which the given image and the given depth map are captured; and send, to the at least one server, the pose information indicative of the given pose of the at least one camera. Optionally, the processor of the device is configured to employ at least one data processing algorithm to process the pose-tracking data. Examples of the at least one data processing algorithm include a feature detection algorithm, an environment mapping algorithm, and a pose data extrapolation algorithm.

Notably, the first image and the second image are those images (from amongst the plurality of images) whose respective fields of view at least partially overlap with each other. This is because only when said respective fields of view at least partially overlaps with each other, the same object would be visible in both the first image and the second image. The given pair of the first image and the second image may constitute a stereo image pair representing the given scene of the real-world environment in a 3D realistic manner.

Optionally, the first image and the second image are captured:
simultaneously using different cameras, or
using a same camera or different cameras at different instances of time, wherein at least one of: (i) the same camera or the different cameras, (ii) the same object moves between the different instances of time.

In this regard, in some implementations, the first image and the second image are captured at a same time using the different cameras. For example, the first image is captured using a first camera from amongst the different cameras, whereas the second image is captured using a second camera from amongst the different cameras. In such implementations, the different cameras could be arranged at different fixed locations (namely, positions) within the real-world environment. However, orientations of the different cameras could be same or could be different with respect to each other. The different cameras may employ different focal lengths for capturing the first image and the second image representing the same object. Additionally, when capturing the given pair of the first image and the second image, fields of view of the different cameras (for example, such as fields of view of the first camera and the second camera) at least partially overlap with each other.

In other implementations, the first image and the second image are captured at different time instants using the same camera or the different cameras. In this regard, at least a pose of the same camera may change or a pose of one of the different cameras may change while capturing the first image and the second image. In such a case, the first image and the second image are (slightly) different from each other as a viewpoint and/or a view direction of the aforesaid cameras(s) change. Additionally, optionally, a position and/or an orientation of the same object could also change between the different instances of time. Resultantly, the same object in the one of the first image and the second image appear to have moved or changed its orientation from its previous position/orientation in the another of the first image and the second image. It will be appreciated that a given camera can be mounted on the device (for example, such as the HMD device) such that a location of the device changes between the different instances of time. Likewise, the device could also be arranged on a remote device, for example, such as a drone, a robot, a vehicle, or similar.

Optionally, the first image and the second image are captured using different cameras that are focused at different focal planes or that have different apertures. In this regard, a given camera from amongst the different cameras has an adjustable focus. This means that the given camera is focusable i.e., a focal plane of at least one optical element (for example, such as a camera lens) of the given camera is adjustable. Herein, focusing the different cameras at the different focal planes (namely, adjusting an optical focus of the different cameras) enables in capturing the first image and the second image in manner that the same object is in-focus in the one of the first image and the second image, but is out-of-focus in another of the first image and the second image.

Alternatively, the first image and the second image are captured using different cameras that have different apertures. In this regard, a given camera from amongst the different cameras has an adjustable aperture. Herein, when a given camera has a smaller aperture, the given camera facilitates in capturing sharp (i.e., in-focus) images across a wide range of distances in the real-world environment. Conversely, when a given camera has a larger aperture, the given camera facilitates in capturing images of the real-world environment in low-light conditions. In such a case, a given image is sharply captured when an optical depth of a given object lies within a given focusing distance range of the given camera, but is captured blurred when said optical depth lies outside the focusing distance range. In an example, the first image and the second image are captured using a first camera and a second camera from amongst the different cameras having an aperture setting 1 and an aperture setting 2, respectively.

Optionally, the first image and the second image are captured using different fixed-focus cameras that are focused at different focal planes. In this regard, a given fixed-focus camera from amongst the different fixed-focus cameras is focus free, i.e., having a non-adjustable focus. In other words, a focal plane of at least one optical element (for example, a camera lens) of the given fixed-focus camera may be fixed at a hyperfocal distance. As an example, the optical focus of said camera may lie at infinity. It will be appreciated that the different fixed-focus cameras facilitate in simplifying an overall design and working of said cameras. This also facilitates in implementing the system with minimal complexity. The different fixed focus cameras are designed to focus at different fixed focal planes, to create selective focusing effect just like a human eye, and blurs out any distractions in a background and/or a foreground in a given image. The technical benefit of using the different fixed-focus cameras is that the aforesaid cameras facilitate in cross-compensate viewing of the same object when the different fixed-focus cameras capture different views (such as close-up views and long shot views) of the same object. Similarly, multiple stereo lenses of the different fixed-focus cameras help to cross-compensate views of a same focus area at different instances of time in the close-up views and long shot views.

In an example implementation, the device may be implemented as an HMD device, wherein the HMD device may comprise a given fixed-focus camera. The given fixed-focus camera may have a focusing distance range from 1 m up to 2 m. The HMD device may be worn by a pilot in an XR simulation of a cockpit of an airplane. The cockpit may comprise an overhead panel whose optical depth may overlap at least partially with the focusing distance range of the given fixed-focus camera when said overhead panel is imaged by the given fixed-focus camera at a distance of 1.5 m from the overhead panel. Therefore, an image having a sharp view of the overhead panel may be captured. However, when the overhead panel lies at an optical depth of 0.5 m from the given fixed-focus camera (for example, when the pilot views the overhead panel by moving his/her head towards the overhead panel), a blurred image of the overhead panel may be captured. Hence, the aforementioned steps of the method may be used to analyse previous images for subsequently determining the point spread function.

Optionally, the at least one camera comprises at least one fixed-focus camera, wherein the first image and the second image are captured at different temperatures of a camera lens of the at least one fixed-focus camera. In this regard, different look up tables can be computed for different temperatures of the camera lens of the at least one fixed-focus camera. A look up table for a given temperature includes values of the PSF at the given temperature for different optical depths. Herein, an increase in a temperature of the camera lens, for example, due to self-heating of the fixed-focus camera and/or an ambient temperature, could have a physical impact (such as, for example, drifting of the focus of the at least one fixed-focus camera) on said camera lens and could interfere with optical properties of the camera lens. This may result in image shifting and zooming effects in the first image and the second image.

Throughout the present disclosure, the term "image segment" of a given image refers to a portion (namely, a segment) of a given image that represents a given object or its part present in the real-world environment. The given image is at least one of: the first image, the second image, the third image.

Optionally, when identifying the at least one image segment of the first image and the at least one image segment of the second image that represent the same object, the at least one server is configured to: extract features from the first image and the second image; and match a given feature in the first image with a corresponding feature in the second image. Examples of the features include, but are not limited to, edges, corners, blobs, ridges, high-frequency features (such as high frequency colour changes). Optionally, the at least one server is configured to employ at least one data processing algorithm for extracting features from the given image. Examples of the at least one data processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like). It will be appreciated that the at least one server need not identify the objects or their parts in the first image and the second image, but only need to identify image segments of the first image and the second image that represent the same object.

It is to be understood that when the same object is in-focus in the one of the first image and the second image, the same object appears sharp (i.e., high-resolution) in the one of the first image and the second image. In such a case, features (such as edges) of the same object are sharp and high contrast. When the same object is out-of-focus in the another of the first image and the second image, the same object appears blurred in the another of the first image and the second image. Such a blurriness could be due to varying lens characteristics (such as a distortion) across a field of view of the at least one camera that captures the another of the first image and the second image. A type of blur could be a defocus blur, a motion blur, and the like. In this regard, the at least one server is configured to determine that the same object is in-focus in a given image by checking whether an optical depth of the same object overlaps with a focusing distance range (i.e., a combination of a focusing distance and a depth-of-field) of the at least one camera employed for capturing the given image. When the optical depth of the same object overlaps with the focusing distance range of the at least one camera, the same object is determined to be in-focus in the given image, whereas when the optical depth of the same object does not overlap with the focusing distance range of the at least one camera, the same object is determined to be out-of-focus in the given image. It will be appreciated that when different parts of the same object are present at different optical depths, some part(s) of the same object may appear in-focus in the one of the first image and the second image, while remaining part(s) of the same object may appear out-of-focus in the one of the first image and the second image. Referring to and continuing with the first example, some legs (such as two front legs) of the table may appear in-focus, while remaining legs (such as two back legs) of the table may appear out-of-focus in the one of the first image and the second image.

Optionally, the step of identifying the at least one image segment of the first image and the at least one image segment of the second image comprises:
    identifying a plurality of image segments of the first image and a plurality of image segments of the second image that represent same objects that are present in the real-world environment;
    computing weights for the plurality of image segments of the first image and the plurality of image segments of the second image, wherein a weight of a given image segment is calculated based on at least one of:
        a gradient of optical depth across the given image segment, when a given same object is out-of-focus in the given image segment,
        a difference in optical depth between the given same object and a neighbourhood of the given same object, when the given same object is out-of-focus in the given image segment,
        a contrast of features in the given image segment, when the given same object is in-focus in the given image segment; and
    selecting the at least one image segment of the first image and the at least one image segment of the second image, from amongst the plurality of image segments of the first image and the plurality of image segments of the second image, based on the weights computed for the plurality of image segments of the first image and the plurality of image segments of the second image.

It will be appreciated that the first image and the second image may represent multiple objects that are common (i.e., are visible) in both the first image and the second image. In this regard, some of the (same) multiple objects may be in-focus in the first image, but may be out-of-focus in the second image; while remaining of the (same) multiple objects may be in-focus in the second image, but may be out-of-focus in the first image. Optionally, when identifying the plurality of image segments of the first image and the plurality of image segments of the second image that represent the same objects, the at least one server is configured to: extract features from the first image and the second image by employing the at least one data processing algorithm; and match a given feature in the first image with a corresponding feature in the second image. Examples of the features and the at least one data processing algorithm have already been described earlier.

Subsequently, the weights for the given image segment are computed, based on the aforementioned criteria. Optionally, lesser the gradient of the optical depth across the given image segment, higher is the weight of the given image segment, and vice versa. This is because when the different parts of the given same object are present at (almost) similar optical depths throughout the given image segment, i.e., optical depths of the different parts of the given same object would lie within a predefined range from each other, the optical depths will have less interference each other, across said image segment. Optionally, the predefined range lies in a range of 10 centimetres to 50 centimetres. As an example, the predefined range may be from 10 or 20 centimetres up to 25, 35 or 50 centimetres. More optionally, the predefined range lies in a range of 10 centimetres to 30 centimetres. Yet more optionally, the predefined range lies in a range of 10 centimetres to 20 centimetres. The term "gradient" refers to a difference in the optical depth of the given same object across the given image segment. Additionally, optionally, lesser the difference in the optical depth between the given same object and a neighbourhood of the given same object, higher is the weight of the given image segment. This is because when optical depths of the given same object and the neighbourhood of the given same object lie within the predefined range from each other, it is indicative of a flatness of the neighbourhood and the given same object from a perspective of the given camera that has captured a given image in which the given same object is out-of-focus. Herein, the term "flatness" refers to a two-dimensional nature of the given image segment due to a lack of any change in depth. Optionally, higher the contrast of features in the given image segment, higher is the weight of the given image segment. This is because when the given same object is in-focus, features of the given same object are clearly represented by the given image segment, and thus are high in contrast. Consequently, the weights computed for the plurality of image segments of the first image and the plurality of image segments of the second image are prioritised in a descending order, and the given image segment having higher weight is selected to be the at least one image segment of the first image and the at least one image segment of the second image.

For example, a given camera may have captured a blurred image of the real-world environment, wherein a given image segment of the blurred image represents a single bright spot on a surface of the real-world environment. The single bright spot in the given image segment may be surrounded by darker areas in a neighbourhood of the given image segment, wherein such darker areas are located at a similar distance as that of the single bright spot from the given camera. Hence, the gradient of the optical depth, and the difference in the optical depth between the single bright spot and the darker areas in a neighbourhood of the single bright spot may be determined to compute a weight for the given image segment. Additionally, such a bright spot has a high-contrast feature in the given image segment when said bright spot is in-focus in the given image segment.

Notably, the first image is captured from a perspective of the first camera pose of the at least one camera, whereas the second image is captured from a perspective of the second camera pose of the at least one camera. Since the plurality of depth maps (comprising at least the first depth map and the second depth map) are already and readily available to the at least one server, the optical depths in the segment of the first depth map and the optical depths in the segment of the second depth map can be easily and accurately known. It is to be understood that the first depth map corresponds to the first image, whereas the second depth map corresponds to the second image. In addition to this, since the at least one image segment of the first image and the at least one image segment of the second image are identified by the at least one server itself, locations (namely, coordinates) of the at least one image segment of the first image and the at least one image segment of the second image are accurately known to the at least one server. The aforesaid locations allow the at least one server to ascertain where exactly the same object is present in the field of view of the first image and in the field of view of the second image. Therefore, the at least one server can easily and accurately determine the first relative pose of the same object and the second relative pose of the same object.

The at least one image segment is selected in a manner that when the same object is in-focus in the first image, the same object is out-of-focus in the second image. The first relative pose and the second relative pose of the same object depends on locations of the same object in the fields of view of the first image and the second image, respectively. Similarly, multiple objects could span across the fields of view of the first image and the second image, wherein the multiple objects could be represented by different portions of the first image and the second image. Hence, the relative poses of said multiple objects would be different in the first image and the second image. Herein, the "at least the at least one image segment" of the first image refers to a portion of the first image that entirely represents the same object and may also represent other image segments surrounding (namely, in vicinity of) the at least one image segment representing the same object. Beneficially, in such a case, at least the at least one image segment is selected to cover a radius of the point spread function (PSF) for the given camera.

It will be appreciated that the at least one server could reproject an entirety of the first image from the first relative pose to the second relative pose, and crop a reprojected image segment from the reprojected first image. However, the technical benefit of reprojecting at least the at least one image segment of the first image (instead of reprojecting the entirety of the first image) is that it reduces processing complexity and processing time of the at least one server, and minimizes error related to a position of the same object in the first image.

It is to be noted that when the same object is in-focus in the first image, the at least one image segment of the first image is reprojected because visual quality (for example, in terms of resolution) of the at least one image segment of the first image is considerably higher as compared to visual quality of the at least one image segment of the second image.

Furthermore, as the first image and the second image are captured from different poses of the at least one camera, a viewpoint and a view direction of the at least one camera that is used to capture the first image and the second camera would be different. Resultantly, there would always be some offset/skewness between the first image and the second image. In such a case, at least the at least one image segment of the first image is reprojected from the first relative pose to the second relative pose in order to match the at least one image segment of the first image upon reprojection with the at least one image segment of the second image, according to a difference in the viewpoints and the view directions of the at least one camera. Optionally, when reprojecting at least the at least one image segment of the first image from the first relative pose to the second relative pose, the at least one server is configured to employ at least one image reprojection algorithm. Such image reprojection algorithms are well-known in the art.

Throughout the present disclosure, the term "point spread function" refers to responses of at least one optical element of the at least one camera to any one of: a point source, a point object. Ideally, the PSF is a two-dimensional (2D) diffraction pattern of light that is formed when an infinitely small point-like light source is imaged through the at least one optical element (for example, a lens system) of the at least one camera. A shape of the PSF is affected by optical properties of the at least one optical element, a distance between the infinitely small point-like light source and the at least one optical element, and a location of said light source within a field-of-view of the at least one camera. However, in practice, PSFs often appear like a Gaussian function, due to at least one of: diffraction of light, aberration of the at least one optical element, image sensing. The at least one optical element could be a lens of the at least one camera. The PSF is a measure for the quality of the at least one camera, as it reveals how the at least one point is blurred in a given image. The PSF allows for correction of out-of-focus blur in the given image. If there is no out-of-focus blur, the PSF is centred about zero. The out-of-focus blur causes the PSF to move away from zero by an amount that is directly proportional to a shift in a pixel of the given image. Knowing the PSF of the at least one camera is important for restoring sharpness of an original object with deconvolution in the given image. The PSF may be independent of a position in a plane of the object. The PSF varies depending on a wavelength of the light. For example, shorter wavelengths of the light (for example, such as a blue light of 450 nanometres) result in a PSF that is smaller than a PSF of a longer wavelength of the light (for example, such as a red light of 650 nanometres). The PSF may further depend on a numerical aperture (NA) of the lens (such as an objective lens) of the at least one camera. In an example, an objective lens having a higher NA may result in a smaller PSF when compared to an objective lens having a smaller NA. Moreover, the PSF may vary spatially across the lens. In other words, the PSF may vary across a field-of-view of the lens. This may be due to manufacturing tolerances of the lens which deteriorate the PSF towards edges of the lens. For example, a PSF for a point along an optical axis of the lens can be (slightly) different from a PSF for a point that is towards a periphery of the field-of-view of the lens. Thus, it is difficult to design a lens which projects a point to an image plane when moving from a centre of the lens towards an edge of the lens.

The correlation between the reprojected pixels of the at least one image segment of the first image and the respective pixels of the at least one image segment of the second image refers to a mathematical relation between pixel values of the reprojected pixels and pixel values of the respective pixels, for example, as expressed above mathematically. The aforesaid correlation could be determined by the at least one server using at least one: a mathematical formula, a mathematical function, a mapping between a given reprojected pixel and a respective pixel. Techniques for determining a correlation between pixels of different images are well-known in the art. One example of such a technique has been described hereinbelow. A person skilled in the art will recognize many variations, alternatives, and modifications of techniques for determining the PSF.

It will be appreciated that the determination of the PSF can be represented mathematically as follows:

$$\text{blurred\_image} = \text{ideal\_image} ** PSF \text{(Convolution)}$$

wherein, ** (double asterisk) represents convolution.

In other words, a blurred image is generated due to convolving of an ideal image with the PSF of the given camera.

In the Fourier domain:

$$\text{blurred\_image}\_FT = \text{ideal\_image}\_FT * PSF\_FT \text{(Multiplication)}$$

wherein, * (single asterisk) represents multiplication.

In other words, a Fourier transform of the blurred image is equal to a multiplication of a Fourier transform of the ideal image and a Fourier transform of the PSF.

$$\text{Therefore, } PSF\_FT = \text{blurred\_image}\_FT / \text{ideal\_image}\_FT$$

$$PSF = \text{inverseFT}(\text{blurred\_image}\_FT / \text{ideal\_image}\_FT)$$

Thus, the PSF can be determined by applying an inverse Fourier transform to a division of the Fourier transform of the blurred image and the Fourier transform of the ideal image. Hereinabove, the "ideal image" refers to a reprojected version of an image segment that is in focus, while the "blurred image" refers to a corresponding image segment that is out of focus.

Optionally, the PSF is determined by utilising blind PSF estimation. The blind PSF estimation relies on features like sharp edges in a pair of images (for example, the first image and the second image). Blind PSF estimation is well-known in the art.

Optionally, the PSF for the given camera is determined based on single-pixel imaging (SPI). The SPI can be applied to each pixel of a given image obtained from the point object, in order to determine light transport coefficients at different optical depths. Herein, the light transport coefficients are space variant and are regarded from the point object to the pixels of the given image. Hence, the PSF of each point object can be determined. Furthermore, the PSF can be calculated based on the optical depths by using phase-shifting principles and perspective algorithms. One such way of determining the PSF is described, for example, in "Space-variant point spread function measurement and interpolation at any depth based on single-pixel imaging" by Hongzhi Jiang, Yu Wang, et al., published in in Optics Express, Vol. 28, Issue 7, pp. 9244-9258, 30 Mar. 2020, which has been incorporated herein by reference.

It will be appreciated that the aforementioned steps of the method are repeated for multiple pairs of images (i.e., multiple pairs of an in-focus image and an out-of-focus image) that represent a same object. This facilitates the at least one server to determine PSFs for all cameras that captured images in which some objects are out-of-focus.

Additionally, optionally, the method further comprises when the same object is in-focus in the second image, reprojecting at least the at least one image segment of the second image from the second relative pose to the first relative pose; and determining for a given camera that captured the first image a point spread function as a function of optical depth, based on a correlation between reprojected pixels of the at least one image segment of the second image and respective pixels of the at least one image segment of the first image, and respective optical depths in the segment of the first depth map corresponding to the at least one image segment of the first image.

The at least one image segment is selected in a manner that when the same object is in-focus in the second image, the same object is out-of-focus in the first image. Herein, the "at least the at least one image segment" of the second image refers to a portion of the second image that entirely represents the same object and may also represent other image segments surrounding (namely, in vicinity of) the at least one image segment representing the same object.

It will be appreciated that the at least one server could reproject an entirety of the second image from the second relative pose to the first relative pose, and crop another reprojected image segment from the reprojected second image. The technical benefit of reprojecting the at least the at least one image segment of the second image (instead of reprojecting the entirety of the second image) is similar to the technical benefit of reprojecting the at least the at least one image segment of the first image, as described above.

It is to be noted that when the same object is in-focus in the second image, the at least one image segment of the second image is reprojected because visual quality of the at least one image segment of the second image is considerably higher as compared to visual quality of the at least one image segment of the first image. Whenever there is some offset/skewness between the first image and the second image, at least the at least one image segment of the second image is reprojected from the second relative pose to the first relative pose in order to match the at least one image segment of the second image upon reprojection with the at least one image segment of the first image, based on a difference in the viewpoints and the view directions of the at least one camera. Optionally, when reprojecting at least the at least one image segment of the second image from the second relative pose to the first relative pose, the at least one server is configured to employ the at least one image reprojection algorithm. The PSF for the given camera that captured the first image is determined in a manner similar to the PSF determined for the given camera that captured the second image, as described above.

The correlation between the reprojected pixels of the at least one image segment of the second image and the respective pixels of the at least one image segment of the first image refers to a mathematical relation between the pixel values of the reprojected pixels and the pixel values of the respective pixels. The aforesaid correlation can be determined in a manner as mentioned above.

Optionally, the at least one image segment of the first image represents the same object as well as a first portion of a neighbourhood of the same object as captured from a perspective of the first camera pose, and the at least one image segment of the second image represents the same object as well as a second portion of the neighbourhood of the same object as captured from a perspective of the second camera pose. The term "neighbourhood" refers to a region of the real-world environment that is visible beside the same object in the first image and the second image. Herein, the first portion of the neighbourhood and the second portion of the neighbourhood, of the same object is not necessarily in close physical proximity of the same object. The first portion of the neighbourhood and the second portion of the neighbourhood are considered by the at least one server in order to cover a radius of the PSF. Such a radius can be half of a diameter of an area in which light emanating from the at least one of: the point source, the point object, spreads.

The at least one server corrects the third image using the point spread function. The third image is a visual representation of the real-world environment that is captured from a perspective of a third camera pose of the given camera. The third camera pose could be same as one of the first pose and the second pose. Alternatively, the third camera pose could be different from the first camera pose and the second camera pose.

Moreover, it will be appreciated that the third image could be any one of: the first image, the second image, an image captured after the first image and the second image, an image captured prior to the first image and the second image. In other words, the EDOF correction can also be applied to the images from which the point spread function (PSF) was determined.

Optionally, the at least one server is configured to obtain pose information of the third camera pose (that is, a corresponding camera pose of the given camera from which the third image and the third depth map are captured) from the device comprising the given camera. Such pose information allows the at least one server to utilise the third image for updating the PSF by repeating the aforementioned steps of the method of the present disclosure. It will be appreciated that at least one model of PSFs across various optical depths, for each camera in the at least one camera is maintained at the data repository. The technical benefit of maintaining the at least one model of PSFs across various optical depths is that it can be easily updated and used by the at least one server.

Throughout the present disclosure, the term "extended depth-of-field correction" refers to a corrective image processing operation that emulates a visual effect of extension of the depth-of-field over which the objects or their parts in the real-world environment appear to be in-focus (i.e., well focused) in a given image. Herein, the term "depth-of-field" refers to a distance between a nearest point and a farthest point in the real-world environment that are acceptably sharply focused in the given image captured by the given camera. The term "given image" encompasses the third image. A nearest point lies in front of a focus point (for example, such as an object) on which a lens of the given camera is actually focused, while the farthest point lies behind the focus point. The nearest point and the farthest point may be at an equal distance or at an unequal distance from the focus point. The depth-of-field (DOF) may be determined based on at least one of: a focal length of the lens of the given camera, a distance between the object and the given camera, a pixel size, an aperture size, a transmission characteristic of an aperture, a number of apertures (i.e., in case of the given camera having multiple apertures). The extension of the depth-of-field does not sacrifice resolution or brightness, thereby clearly capturing the objects in the real-world environment without a need to adjust the focus of the given camera and an angle between the objects and the given camera. The EDOF correction enables deblurring of objects that lie outside of a focal region of the lens of the given camera (i.e., outside the depth-of-field of the lens of the given camera) to produce an extended-in-focus view of the real-world environment. The EDOF correction may be applied to capture in-focus images of at least one of: multiple objects present in at least a foreground and/or a background of a given object in the real-world environment, oblique objects, objects at different heights, objects at different depths.

When the at least one image segment of the third image is out of focus, this means optical depths corresponding to the at least one image segment of the third image lie outside the focusing distance range of the given camera. Therefore, when the EDOF correction is applied to the at least one image segment of the third image, pixel values of the at least one image segment of the third image are corrected accordingly, by using the point spread function. Beneficially, upon applying the EDOF correction, the at least one image segment of the third image appears realistic and highly accurate as objects represented in the at least one image segment appear acceptably sharp (i.e., well focused and clearly visible). Thus, an immersive and realistic viewing experience could be provided to a user viewing the third image.

It will be appreciated that the EDOF correction could also be applied by utilising at least one of: defocus map estimation, blind image deblurring deconvolution, non-blind image deblurring deconvolution. These techniques are well-known in the art. The EDOF correction may be performed by employing a deblurring neural network implemented using deep learning techniques, to correct (i.e., deblur) the third image, outside a focal region of a lens of the given camera. One such deblurring neural network using deep learning techniques is described, for example, in "EDoF-ToF: extended depth of field time-of-flight imaging" by Jasper Tan, Vivek Boominathan et al., published in Optics Express, Vol. 29, Issue 23, pp. 38540-38556, November 2021, which has been incorporated herein by reference.

Optionally, the EDOF correction is applied by employing a Wiener filter to deconvolve the at least one image segment of the third image with the PSF determined for the given camera. When a distance of each pixel of the at least one image segment of the third image is known along with the PSF for the given camera at said distance, a sharper version of the third image (namely, the EDOF-corrected third image) can be recovered from a blurred version of the third image. Herein, the Wiener filter can be used for deconvolution effectively when a frequency characteristic of the at least one image segment of the third image and/or an additive noise in the at least one image segment of the third image are at least partially known. When the additive noise is absent in the at least one image segment, the Wiener filter is reduced to an ideal inverse filter. The aforesaid deconvolution process could be customised based on inputs provided by a user device, wherein the user device is associated with a user. Based on these inputs, at least one of: a noise-to-signal power value, an autocorrelation function, could be used to refine the deblurring of the at least one image segment of the third image.

Moreover, optionally, the method further comprises updating the PSF of the given camera by employing a neural network to predict a value of the PSF for a given optical depth based on values of the PSF for at least two optical depths that are determined based on said correlation. Herein, the neural network is used to improve accuracy of determining the PSF of a given camera, thereby improving a quality of EDOF correction. Specifically, the neural network is employed especially when the PSF corresponding to only specific optical depths are known. It will be appreciated that a linear interpolation can also be used to predict the value of the PSF for the given optical depth as an intermediate value of the values of the PSF for at least two optical depths. Optionally, in this regard, the at least one server is configured to employ a linear interpolation technique to interpolate and/or extrapolate values of the PSF determined for at least two optical depths (based on the aforesaid correlation) to determine a value of the PSF for a given optical depth. This may be particularly beneficial in cases where PSFs can be determined for only a few optical depths based on said correlation.

The neural network could also be employed for compensating manufacturing differences between a plurality of cameras, based on manufacturing tolerances of the plurality of cameras. Herein, the term "manufacturing tolerance" refers to an amount of variation in camera parameters that is inherent while manufacturing a given camera. The technical benefit of using the manufacturing tolerances to predict the value of the PSF is that the neural network is able to quickly converge on accurate values of the PSF, based on values of manufacturing tolerances of cameras that are manufactured on a same assembly line.

Optionally, the method further comprises:

obtaining information indicative of a gaze direction of a user;

determining a gaze region in the third image, based on the gaze direction of the user; and applying the extended depth-of-field correction to the at least one image segment of the third image that is out of focus, only when the at least one image segment of the third image overlaps with the gaze region.

In this regard, the information indicative of the gaze directions of the user's eyes are received the user device of the user, which comprises from gaze-tracking means. The term "gaze-tracking means" refers to a specialized equipment for detecting and/or following gaze of the user. The term "gaze direction" refers to a direction in which the user is gazing. The gaze direction may be indicated by a gaze vector. The gaze tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze directions of the user is received repeatedly from the gaze-tracking means, as gaze of the user keeps changing.

The term "gaze region" refers to a gaze-contingent area in the real-world environment where at the gaze direction of the user is directed (namely, focused). The gaze region may depend on accuracy of the gaze-tracking means as well as a size of a natural human gaze region for an optical depth at which the user is gazing. It will be appreciated that when user's gaze is directed (namely, focused) towards a point or a region within the real-world environment, a gaze direction of a first eye and a gaze direction of a second eye of the user are different from each other, and both the gaze directions will converge at said point or said region. Since the gaze direction of the user in the real-world environment is known, the gaze region could be easily and accurately determined in the real-world environment. When the at least one image segment of the third image overlaps with the gaze region, it is beneficial to deblur the at least one image segment of the third image as compared to other image segments of the third image. Thus, the at least one server applies the EDOF correction selectively to the at least one image segment of the third image, so that the at least one image segment (representing gaze-contingent objects) of the third image could be perceived by the user with a high visual acuity. Beneficially, the user experiences high gaze-contingency and considerable realism upon viewing the third image upon the EDOF correction. In this manner, processing resources and processing time of the at least one server could be minimized as the EDOF correction is applied only when the at least one image segment of the third image overlaps with the gaze region. Thus, when the at least one image segment of the third image does not overlap (i.e., lies outside) with the gaze region, the EDOF correction need not be applied.

The present disclosure also relates to the system and to the computer program product as described above. Various embodiments and variants disclosed above, with respect to the aforementioned method, apply mutatis mutandis to the system and to the computer program product.

Optionally, when the same object is in-focus in the second image, the at least one server is configured to:

reproject at least the at least one image segment of the second image from the second relative pose to the first relative pose; and determine for a given camera that captured the first image a point spread function as a function of optical depth, based on a correlation between reprojected pixels of the at least one image segment of the second image and respective pixels of the at least one image segment of the first image, and respective optical depths in the segment of the first depth map corresponding to the at least one image segment of the first image.

Optionally, the at least one server is configured to apply extended depth-of-field correction by employing a Wiener filter to deconvolve the at least one image segment of the third image with the point spread function determined for the given camera.

Optionally, the at least one server is further configured to update the point spread function by employing a neural network to predict a value of the point spread function for a given optical depth based on values of the point spread function for at least two optical depths that are determined based on said correlation.

Optionally, the at least one server is further configured to:

obtain information indicative of a gaze direction of a user;

determine a gaze region in the third image, based on the gaze direction of the user; and apply the extended depth-of-field correction to the at least one image segment of the third image that is out of focus, only when the at least one image segment of the third image overlaps with the gaze region.

Optionally, when identifying the at least one image segment of the first image and the at least one image segment of the second image, the at least one server is configured to:

identify a plurality of image segments of the first image and a plurality of image segments of the second image that represent same objects that are present in the real-world environment;

compute weights for the plurality of image segments of the first image and the plurality of image segments of the second image, wherein a weight of a given image segment is calculated based on at least one of:

a gradient of optical depth across the given image segment, when a given same object is out-of-focus in the given image segment, a difference in optical depth between the given same object and a neighbourhood of the given same object, when the given same object is out-of-focus in the given image segment, a contrast of features in the given image segment, when the given same object is in-focus in the given image segment; and select the at least one image segment of the first image and the at least one image segment of the second image, from amongst the plurality of image segments of the first image and the plurality of image segments of the second image, based on the weights computed for the plurality of image segments of the first image and the plurality of image segments of the second image.

DETAILED DESCRIPTION OF THE DRAWINGS

Figure 1B:
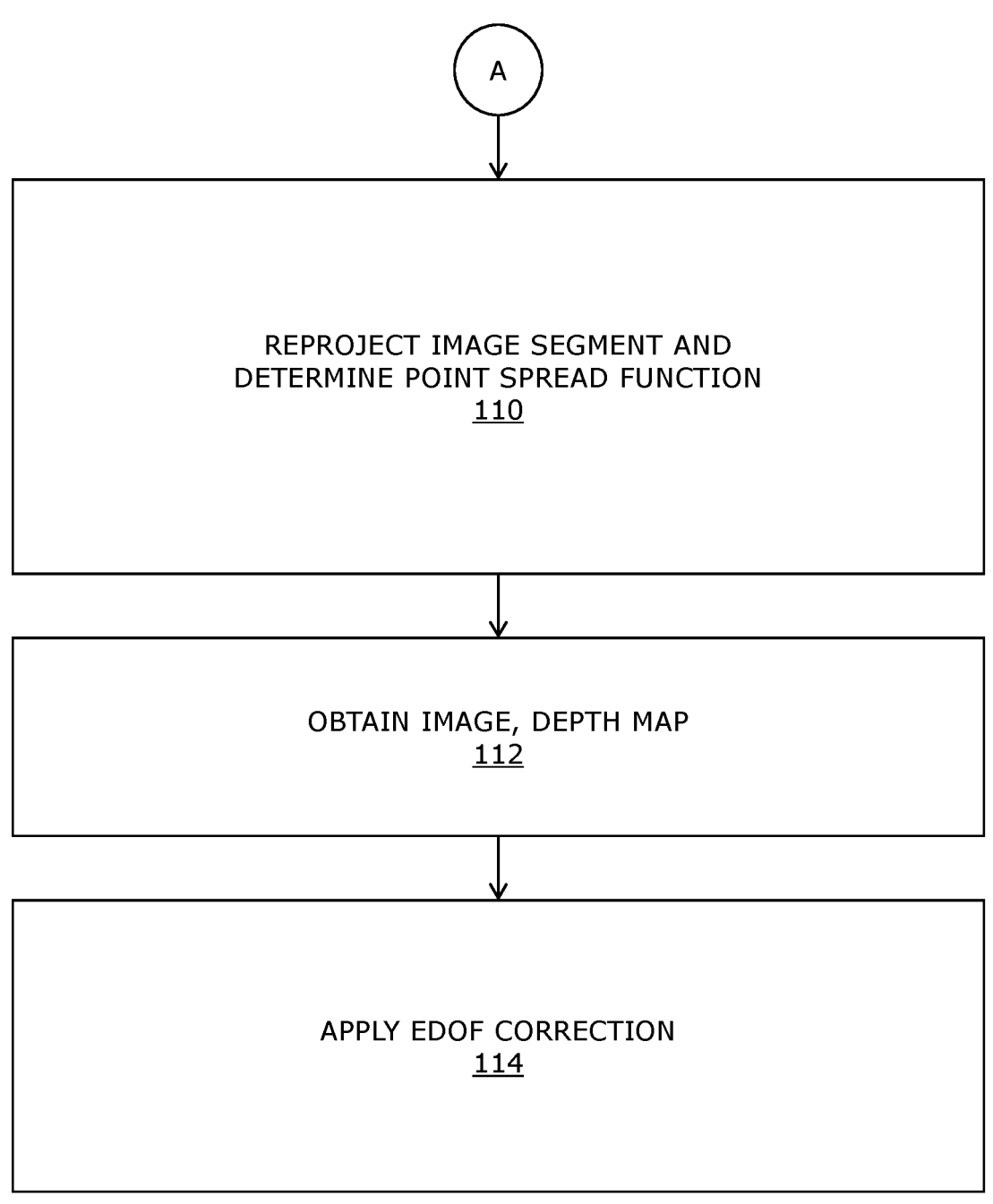

Referring to FIGS. 1A and 1B, illustrated are steps of a computer-implemented method for determining and using point spread function for image deblurring, in accordance with an embodiment of the present disclosure. At step 102, a plurality of images of a real-world environment captured using at least one camera, a plurality of depth maps captured corresponding to the plurality of images, and pose information indicative of corresponding camera poses from which the plurality of images and the plurality of depth maps are captured, are obtained. At step 104, for a given pair of a first image and a second image from amongst the plurality of images, at least one image segment of the first image and at least one image segment of the second image that represent a same object that is present in the real-world environment are identified, wherein the same object is in-focus in one of the first image and the second image, but is out-of-focus in another of the first image and the second image. At step 106, a first relative pose of the same object is determined with respect to a first camera pose from which the first image is captured, based on optical depths in a segment of a first depth map corresponding to the at least one image segment of the first image, and a location of the at least one image segment in a field of view of the first image. At step 108, a second relative pose of the same object is determined with respect to a second camera pose from which the second image is captured, based on optical depths in a segment of a second depth map corresponding to the at least one image segment of the second image, and a location of the at least one image segment in a field of view of the second image. At step 110, when the same object is in-focus in the first image, at least the at least one image segment of the first image is reprojected from the first relative pose to the second relative pose; and a point spread function as a function of optical depth is determined for a given camera that captured the second image, based on a correlation between reprojected pixels of the at least one image segment of the first image and respective pixels of the at least one image segment of the second image, and respective optical depths in the segment of the second depth map corresponding to the at least one image segment of the second image. At step 112, a third image of the real-world environment captured using a given camera and a third depth map captured corresponding to the third image, are obtained. At step 114, an extended depth-of-field correction is applied to at least one image segment of the third image that is out of focus, by using a point spread function determined for the given camera, based on optical depths in a segment of the third depth map corresponding to the at least one image segment of the third image.

The aforementioned steps are only illustrative and other alternatives can also be provided where one or more steps are added, one or more steps are removed, or one or more steps are provided in a different sequence without departing from the scope of the claims herein.

Figure 2:
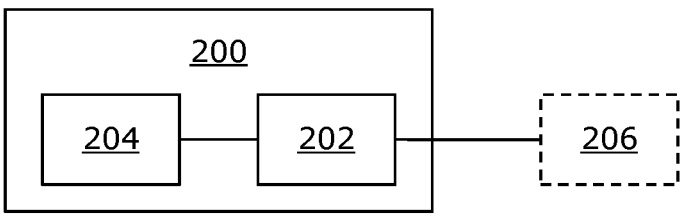
FIG. 2 illustrates a block diagram of a system for determining and using point spread function for image deblurring, in accordance with an embodiment of the present disclosure.

Referring to FIG. 2, illustrated is a block diagram of a system 200 for determining and using point spread function for image deblurring, in accordance with an embodiment of the present disclosure. The system 200 comprises at least one server (depicted as a server 202) and, optionally, a data repository 204 communicably coupled to the server 202. Optionally, the server 202 is communicably coupled to at least one camera (depicted as a camera 206) or to a device comprising the at least one camera.

It may be understood by a person skilled in the art that FIG. 2 includes a simplified architecture of the system 200, for sake of clarity, which should not unduly limit the scope of the claims herein. It is to be understood that the specific implementation of the system 200 is provided as an example and is not to be construed as limiting it to specific numbers or types of servers, data repositories, and cameras. The person skilled in the art will recognize many variations, alternatives, and modifications of embodiments of the present disclosure.

Figure 3A:
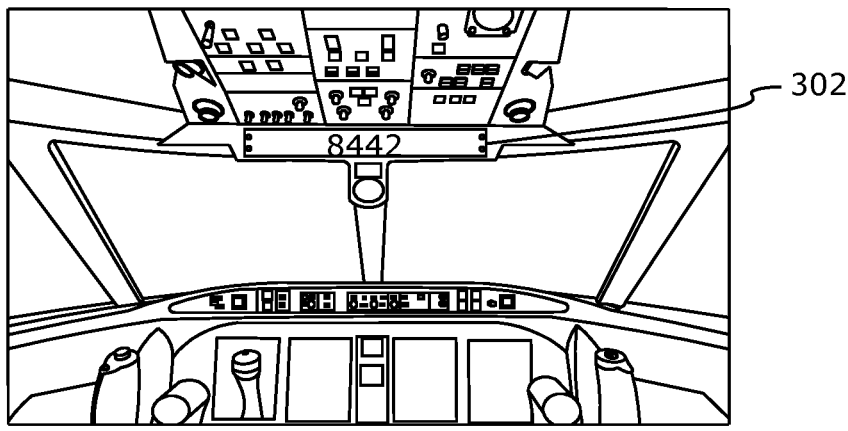
FIGS. 3A and 3B illustrate schematic representations of exemplary images captured using a given camera focused at different focal plane, in accordance with an embodiment of the present disclosure.
Figure 3B:
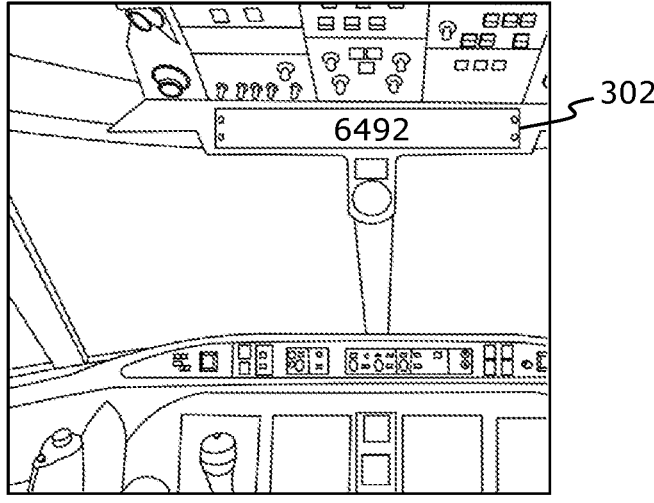

Referring to FIGS. 3A and 3B, illustrated are schematic representations of an exemplary first image and an exemplary second image captured using a given camera focused at a first focal plane and a second focal plane, respectively, in accordance with an embodiment of the present disclosure. The first image and the second image are captured by the given camera from a perspective of a first pose and a second pose of the given camera, respectively. The given camera may, for example, be implemented on a head-mounted display (HMD) device worn by a pilot during a simulation of a cockpit of an airplane.

With reference to FIG. 3A, the first image represents a sharp (i.e., in-focus) view of an overhead panel 302 present in the cockpit, wherein the overhead panel lies, for example, at an optical depth of approximately 1 metre from the given camera. As an example, the overhead panel 302 shows a number '8442' when the first image is sharply captured (that is, in focus). With reference to FIG. 3B, the second image represents a blurred (i.e., out-of-focus) view of the overhead panel 302 present in the cockpit, wherein the overhead panel lies, for example, at an optical depth of 0.5 m from the given camera. This may happen when the pilot moves his/her head close to the overhead panel 302. As an example, the overhead panel 302 incorrectly shows the number '8442' as a number '6492' when the second image is blurred. It will be appreciated that showing "6" to the pilot, while it was "8", could be dangerous. Therefore, performing EDOF correction pursuant to the present disclosure is highly beneficial, especially in critical cases.

FIGS. 3A and 3B are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:
obtaining a plurality of images of a real-world environment captured using at least one camera, a plurality of depth maps captured corresponding to the plurality of images, and pose information indicative of corresponding camera poses from which the plurality of images and the plurality of depth maps are captured;

for a given pair of a first image and a second image from amongst the plurality of images, the first image and the second image being captured from different camera poses using a fixed-focus camera, identifying at least one image segment of the first image and at least one image segment of the second image that represent a same object present in the real-world environment, wherein the same object is one of in-focus in the first image and out of focus in the second image or is in-focus in the second image and out of focus in the first image;

determining a first relative pose of the same object with respect to a first camera pose from which the first image is captured, based on optical depths in a segment of a first depth map corresponding to the at least one image segment of the first image, and a location of the at least one image segment in a field of view of the first image;

determining a second relative pose of the same object with respect to a second camera pose from which the second image is captured, based on optical depths in a segment of a second depth map corresponding to the at least one image segment of the second image, and a location of the at least one image segment in a field of view of the second image;

when the same object is in-focus in the first image,
reprojecting at least the at least one image segment of the first image from the first relative pose to the second relative pose; and
determining, for a given camera that captured the second image, a point spread function as a function of optical depth, based on a correlation between reprojected pixels of the at least one image segment of the first image and respective pixels of the at least one image segment of the second image, and respective optical depths in the segment of the second depth map corresponding to the at least one image segment of the second image, wherein determining the point spread function further comprises estimating the point spread function from the correlation and computing separate point spread functions for a plurality of optical-depth values indicated by the second depth map for the at least one image segment;

obtaining a third image of the real-world environment captured using a given camera and a third depth map captured corresponding to the third image; and applying an extended depth-of-field correction to at least one image segment of the third image that is out of focus, by using a point spread function determined for the given camera, based on optical depths in a segment of the third depth map corresponding to the at least one image segment of the third image.

2. The computer-implemented method of claim 1, further comprising when the same object is in-focus in the second image,
reprojecting at least the at least one image segment of the second image from the second relative pose to the first relative pose; and
determining for a given camera that captured the first image a point spread function as a function of optical depth, based on a correlation between reprojected pixels of the at least one image segment of the second image and respective pixels of the at least one image segment of the first image, and respective optical depths in the segment of the first depth map corresponding to the at least one image segment of the first image.

3. The computer-implemented method of claim 1, wherein the extended depth-of-field correction is applied by employing a Wiener filter to deconvolve the at least one image segment of the third image with the point spread function determined for the given camera.

4. The computer-implemented method of claim 1, further comprising updating the point spread function by employing a neural network to predict a value of the point spread function for a given optical depth based on values of the point spread function for at least two optical depths that are determined based on said correlation.

5. The computer-implemented method of claim 1, wherein the first image and the second image are captured:
  simultaneously using different cameras, or
  using a same camera or different cameras at different instances of time, wherein at least one of: (i) the same camera or the different cameras, (ii) the same object moves between the different instances of time.

6. The computer-implemented method of claim 1, wherein the first image and the second image are captured using different fixed-focus cameras that are focused at different focal planes.

7. The computer-implemented method of claim 1, wherein the at least one camera comprises at least one fixed-focus camera, and wherein the first image and the second image are captured at different temperatures of a camera lens of the at least one fixed-focus camera.

8. The computer-implemented method of claim 1, wherein the first image and the second image are captured using different cameras that are focused at different focal planes or that have different apertures.

9. The computer-implemented method of claim 1, further comprising:
  obtaining information indicative of a gaze direction of a user;
  determining a gaze region in the third image, based on the gaze direction of the user; and
  applying the extended depth-of-field correction to the at least one image segment of the third image that is out of focus, only when the at least one image segment of the third image overlaps with the gaze region.

10. The computer-implemented method of claim 1, wherein the step of identifying the at least one image segment of the first image and the at least one image segment of the second image comprises:
  identifying a plurality of image segments of the first image and a plurality of image segments of the second image that represent same objects that are present in the real-world environment;
  computing weights for the plurality of image segments of the first image and the plurality of image segments of the second image, wherein a weight of a given image segment is calculated based on at least one of:
    a gradient of optical depth across the given image segment, when a given same object is out-of-focus in the given image segment,
    a difference in optical depth between the given same object and a neighbourhood of the given same object, when the given same object is out-of-focus in the given image segment,
    a contrast of features in the given image segment, when the given same object is in-focus in the given image segment; and
  selecting the at least one image segment of the first image and the at least one image segment of the second image, from amongst the plurality of image segments of the first image and the plurality of image segments of the second image, based on the weights computed for the plurality of image segments of the first image and the plurality of image segments of the second image.

11. The computer-implemented method of claim 1, wherein the at least one image segment of the first image represents the same object as well as a first portion of a neighbourhood of the same object as captured from a perspective of the first camera pose, and the at least one image segment of the second image represents the same object as well as a second portion of the neighbourhood of the same object as captured from a perspective of the second camera pose.

12. A computer program product comprising a non-transitory machine-readable data storage medium having stored thereon program instructions that, when executed by a processor, cause the processor to execute steps of a computer-implemented method of claim 1.

13. A system comprising at least one server that is configured to:
  obtain a plurality of images of a real-world environment captured using at least one camera, a plurality of depth maps captured corresponding to the plurality of images, and pose information indicative of corresponding camera poses from which the plurality of images and the plurality of depth maps are captured;
  for a given pair of a first image and a second image from amongst the plurality of images, the first image and the second image being captured from different camera poses using a fixed-focus camera, identify at least one image segment of the first image and at least one image segment of the second image that represent a same object present in the real-world environment, wherein the same object is in-focus in the first image and out of focus in the second image, or is in-focus in the second image and out of focus in the first image;
  determine a first relative pose of the same object with respect to a first camera pose from which the first image is captured, based on optical depths in a segment of a first depth map corresponding to the at least one image segment of the first image, and a location of the at least one image segment in a field of view of the first image;
  determine a second relative pose of the same object with respect to a second camera pose from which the second image is captured, based on optical depths in a segment of a second depth map corresponding to the at least one image segment of the second image, and a location of the at least one image segment in a field of view of the second image;
  when the same object is in-focus in the first image,
    reproject at least the at least one image segment of the first image from the first relative pose to the second relative pose; and
    determine for a given camera that captured the second image a point spread function as a function of optical depth, based on a correlation between reprojected pixels of the at least one image segment of the first image and respective pixels of the at least one image segment of the second image, and respective optical depths in the segment of the second depth map corresponding to the at least one image segment of the second image, wherein determining the point spread function further comprises estimating the point spread function from the correlation and computing separate point spread functions for a plurality of optical-depth values indicated by the second depth map for the at least one image segment;
  obtain a third image of the real-world environment captured using a given camera and a third depth map captured corresponding to the third image; and
  apply an extended depth-of-field correction to at least one image segment of the third image that is out of focus, by using a point spread function determined for the given camera, based on optical depths in a segment of the third depth map corresponding to the at least one image segment of the third image.

14. The system of claim 13, wherein when the same object is in-focus in the second image, the at least one server is configured to:

reproject at least the at least one image segment of the second image from the second relative pose to the first relative pose; and determine for a given camera that captured the first image a point spread function as a function of optical depth, based on a correlation between reprojected pixels of the at least one image segment of the second image and respective pixels of the at least one image segment of the first image, and respective optical depths in the segment of the first depth map corresponding to the at least one image segment of the first image.

15. The system of claim 13, wherein the at least one server is configured to apply extended depth-of-field correction by employing a Wiener filter to deconvolve the at least one image segment of the third image with the point spread function determined for the given camera.

16. The system of claim 13, wherein the at least one server is configured to update the point spread function by employing a neural network to predict a value of the point spread function for a given optical depth based on values of the point spread function for at least two optical depths that are determined based on said correlation.

17. The system of claim 13, wherein the first image and the second image are captured:

simultaneously using different cameras, or using a same camera or different cameras at different instances of time, wherein at least one of: (i) the same camera or the different cameras, (ii) the same object moves between the different instances of time.

18. The system of claim 13, wherein the first image and the second image are captured using different fixed-focus cameras that are focused at different focal planes.

19. The system of claim 13, wherein the at least one camera comprises at least one fixed-focus camera, and wherein the first image and the second image are captured at different temperatures of a camera lens of the at least one fixed-focus camera.

20. The system of claim 13, wherein the first image and the second image are captured using different cameras that are focused at different focal planes or that have different apertures.

21. The system of claim 13, wherein the at least one server is configured to:

obtain information indicative of a gaze direction of a user;

determine a gaze region in the third image, based on the gaze direction of the user; and apply the extended depth-of-field correction to the at least one image segment of the third image that is out of focus, only when the at least one image segment of the third image overlaps with the gaze region.

22. The system of claim 13, wherein when identifying the at least one image segment of the first image and the at least one image segment of the second image, the at least one server is configured to:

identify a plurality of image segments of the first image and a plurality of image segments of the second image that represent same objects that are present in the real-world environment;

compute weights for the plurality of image segments of the first image and the plurality of image segments of the second image, wherein a weight of a given image segment is calculated based on at least one of:

a gradient of optical depth across the given image segment, when a given same object is out-of-focus in the given image segment, a difference in optical depth between the given same object and a neighbourhood of the given same object, when the given same object is out-of-focus in the given image segment, a contrast of features in the given image segment, when the given same object is in-focus in the given image segment; and select the at least one image segment of the first image and the at least one image segment of the second image, from amongst the plurality of image segments of the first image and the plurality of image segments of the second image, based on the weights computed for the plurality of image segments of the first image and the plurality of image segments of the second image.

23. The system of claim 13, wherein the at least one image segment of the first image represents the same object as well as a first portion of a neighbourhood of the same object as captured from a perspective of the first camera pose, and the at least one image segment of the second image represents the same object as well as a second portion of the neighbourhood of the same object as captured from a perspective of the second camera pose.

\* \* \* \* \*